United States Patent
Li

(10) Patent No.: US 6,398,190 B1
(45) Date of Patent: Jun. 4, 2002

(54) CABLE ASSEMBLY AND METHOD

(75) Inventor: Shulong Li, Spartanburg, SC (US)

(73) Assignee: Milliken & Company, Spartanburg, SC (US)

( * ) Notice: Subject to any disclaimer, the term of this patent is extended or adjusted under 35 U.S.C. 154(b) by 0 days.

(21) Appl. No.: 09/699,917

(22) Filed: Oct. 30, 2000

(51) Int. Cl.$^7$ .............................................. B65H 65/00
(52) U.S. Cl. ................................ 254/134.4; 254/134.5; 254/134.3 FT; 385/147
(58) Field of Search ....................... 254/134.4, 134.3 R, 254/134.5, 134.3 FT, 134.3 SC; 385/147, 109, 110, 111, 84

(56) References Cited

U.S. PATENT DOCUMENTS

| | | |
|---|---|---|
| 4,105,284 A | 8/1978 | Olshansky |
| 4,172,106 A | 10/1979 | Lewis |
| 4,368,910 A | 1/1983 | Fidrych |
| 4,374,608 A | 2/1983 | Anderson |
| 4,896,940 A | 1/1990 | Kathiresan et al. |
| 5,002,359 A | 3/1991 | Sayegh |
| 5,013,125 A | 5/1991 | Nilsson et al. |
| 5,113,468 A | 5/1992 | Baker |
| 5,259,055 A | 11/1993 | Cowen et al. |
| 5,267,338 A | 11/1993 | Bullock et al. |
| 5,293,442 A | 3/1994 | Sayegh |
| 5,448,670 A * | 9/1995 | Blew .......................... 385/112 |
| 5,480,203 A | 1/1996 | Favalora et al. |
| 5,615,293 A | 3/1997 | Sayegh |
| 5,675,686 A | 10/1997 | Rosenmayer et al. |
| 5,764,835 A | 6/1998 | Rubin et al. |
| 5,822,485 A * | 10/1998 | Nelson ........................ 385/112 |
| 5,838,864 A | 11/1998 | Patel et al. |
| 6,049,647 A * | 4/2000 | Register ...................... 385/101 |
| 6,055,350 A | 4/2000 | Brown et al. |
| 6,059,264 A * | 5/2000 | Kaminski ................ 254/134.4 |
| 6,179,269 B1 * | 1/2001 | Kobylinski .............. 254/134.4 |
| 4,948,097 C1 * | 5/2001 | Reeve ..................... 254/134.4 |
| 6,270,288 B1 * | 8/2001 | Weidenheft ................. 405/158 |

* cited by examiner

Primary Examiner—Joseph J. Hail, III
Assistant Examiner—Daniel Shanley
(74) Attorney, Agent, or Firm—Terry T. Moyer; Thomas L. Moses

(57) ABSTRACT

A cable assembly includes a cable member and an outer jacket member disposed about the fiber optic cable member in slidable relation. In a preferred embodiment, the outer jacket member is a woven article, made from low friction, synthetic fibers such as polyester, nylon, Teflon, PEEK, or polyvinylidene fluoride. The outer jacket member serves as a sleeve that extends at least the same length as the cable member. In use, the outer jacket carrying the cable member may be attached at one end to a pull cord or tape that extends through the length of a conduit. A pulling force is exerted on the pull cord at a remote end of the conduit, causing the outer jacket member and cable member to be drawn through the conduit. The outer jacket bears most of the force of the pulling action, and the only force exerted directly on the fragile cable member is that of friction between the jacket and the cable. This arrangement substantially increases the amount of force and speed with which the cable assembly may be drawn through the conduit, while reducing the amount of friction and eliminating the need for lubricants during the process.

23 Claims, 2 Drawing Sheets

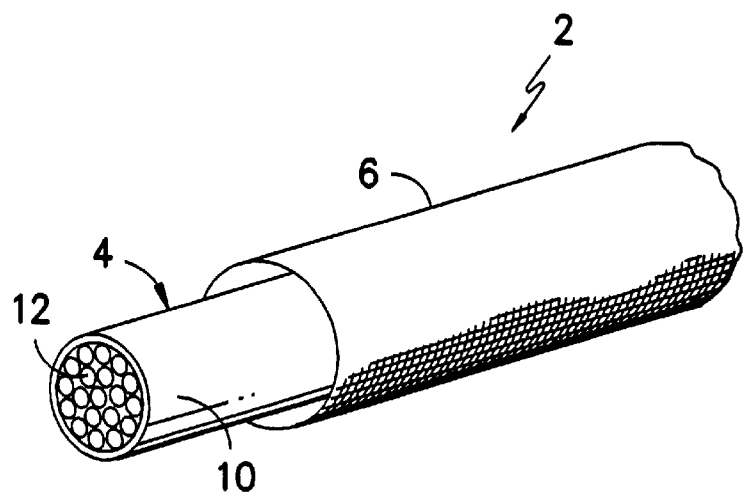
FIG. -1-
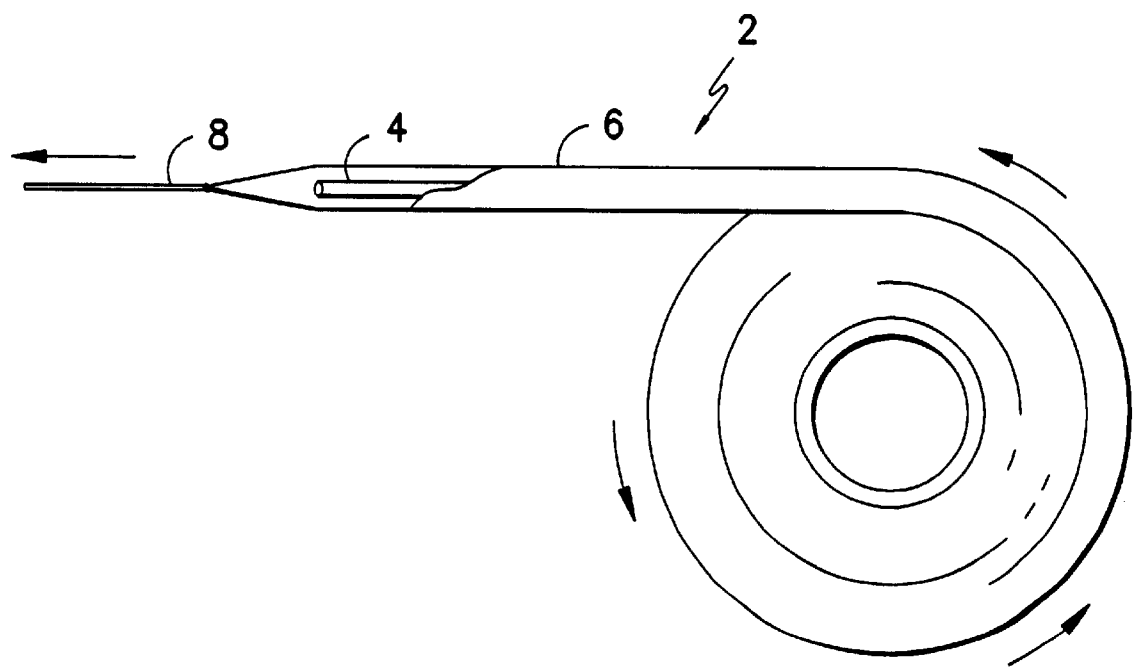
FIG. -2-

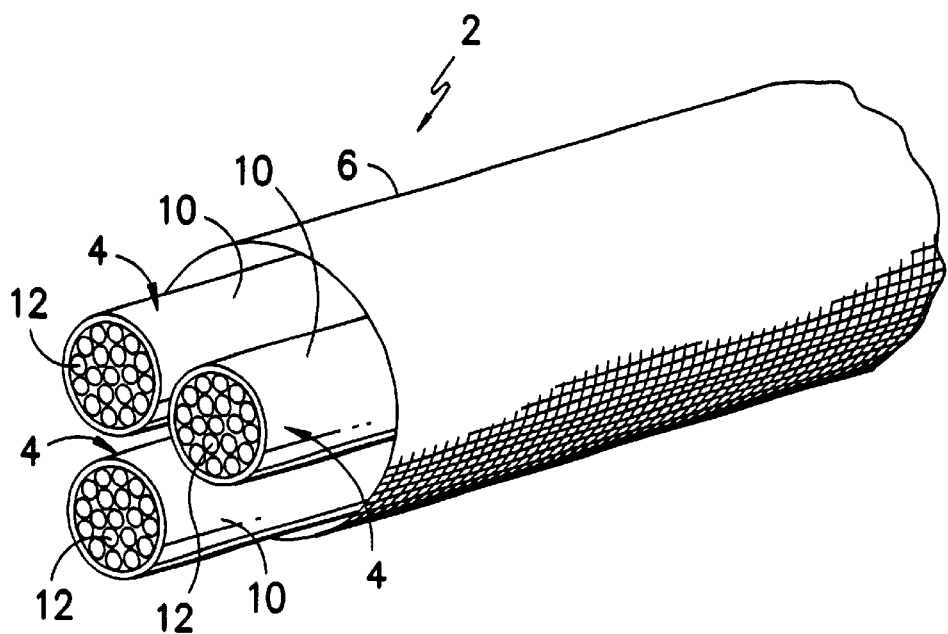
FIG. -3-
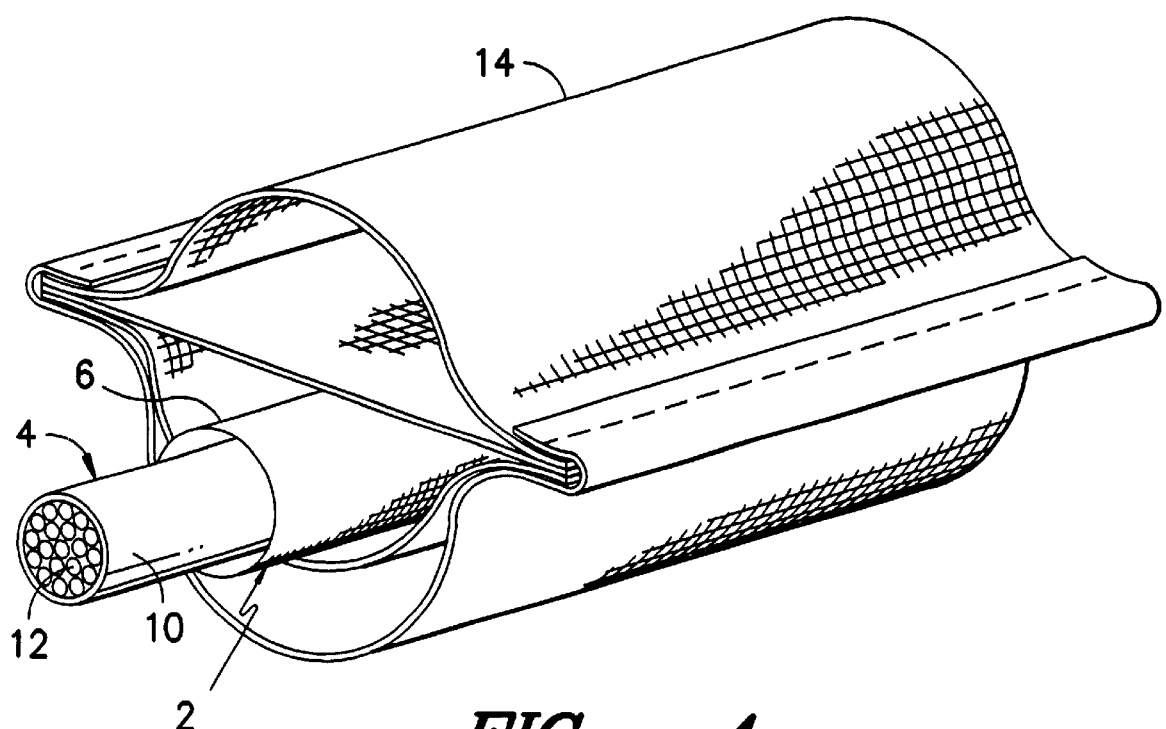
FIG. -4-

CABLE ASSEMBLY AND METHOD

FIELD OF THE INVENTION

This invention relates to cables and methods for inserting cables into conduits. More particularly, this invention relates to fiber optic cables and the like, as well as assemblies for facilitating insertion of the cables into semi-rigid conduits, such as PVC pipes. A method for inserting the cable assembly into a conduit is also disclosed.

BACKGROUND OF THE INVENTION

Heretofore, communications-cables, coaxial cables, fiber optic cables and the like, have been inserted into extended sections of pipe or conduit using a variety of different methods. The "pull" method generally involves attaching a pull cord or pull tape, which is already disposed within the conduit, to one end of the cable, and then pulling the cord or tape from the other end of the conduit until the cable extends through the length thereof. This method has several disadvantages.

First, the amount of force applied to the cable in order to pull the cable through the conduit must remain relatively low. Generally, fiber optic cables will not withstand forces beyond about 600 pounds of force before the optical properties of the glass fibers are significantly affected in a negative manner. Secondly, the force that will be exerted on the cable itself forces the cable manufacturers to use several layers of strength members within the cable itself. These strength members are typically tightly woven sheaths made from fibers of steel or Kevlar®, or some other aramid fiber that exhibits little or no elongation. The strength members are formed and fixed as inner layers of the cable, usually beneath an extruded outer sheath of high-density polyethylene. Because the glass fibers are not elastic, and will be damaged easily due to microbending and other mechanical strains, the strength member must bear most of the force imparted by the pulling and other handling mechanisms in order to protect the optical fibers. These extra layers of strength members add a significant amount of cost to the fiber optic cables.

Another commonly used method for inserting cables into conduits is the "push" or "blow" method, where the cable is subjected to high pressure air, which blows the cable assembly through the conduit. Of course, the cable assembly may also be sucked through the conduit by virtue of a vacuum or low pressure applied to the conduit at the remote end. This method also has limitations, and requires substantial energy and air pressure to force the cable assembly through long lengths of conduit.

Further, a disadvantage of both methods relates to friction between the outer sheathing of the cable and the inner wall of the conduit. The outer sheathing of a fiber optic or coaxial cable is typically made of an extruded polymer, such as polyethylene or polyvinylchloride, generally having a melting point or softening point in the range of 100 to 150° C. The friction generated between the cable sheathing and the inner wall of the conduit substantially limits the speed with which the cable may be drawn through the conduit. If the cable is drawn through the conduit at an excessive rate of speed, certain contact areas of the cable sheathing will melt or burn through. To combat this problem, massive amounts of lubricants have been used in conjunction with the cables and conduits. Supplying the amount of lubricant necessary to pull the cable through an extended length, even at a moderate rate, is an expensive and time-consuming process. Moreover, these lubricants can negatively affect the environment around the cable.

Therefore, it would be advantageous and desirable to provide a cable assembly that reduced friction between the cable and the inner wall of the conduit, which either substantially reduces or eliminates the necessity of using lubricants, and which increases the speed with which the cable could be inserted into the conduit, while providing a minimal amount of stress on the optical fibers to allow for safe installation. Moreover, it would be desirable to provide a cable assembly and method that would allow a substantially greater force to be applied the cable assembly for insertion into the conduit. Further, it would be desirable to provide a cable assembly that could be inserted more quickly and less expensively than those provided heretofore.

SUMMARY OF THE INVENTION

Accordingly, it is an important object of the present invention to provide a cable assembly having an outer jacket disposed about a cable, so that the cable is in slidable relation thereto.

It is another important object of the present invention to provide a cable assembly that may withstand a substantially higher pulling force than that achieved heretofore, without endangering the critical portions of the cable, such as copper, optical fibers, etc.

Yet another important object of the present invention is to provide a cable assembly and method that allows a cable to be inserted into a conduit at a much higher speed and longer pulling distance than has been achieved heretofore, without the necessity of increasing the level of strength of the cable itself.

Still another important object of the present invention is to provide an apparatus and method that allows several cables to be efficiently inserted into a conduit at high speed using a single outer jacket.

It is yet another important object of the present invention to provide a less expensive and more efficient alternative to the current methods and devices used to insert cable into a conduit.

Another important object of the present invention is to provide a cable assembly having an outer jacket that provides abrasion resistance and has a high enough melting point to prevent any burn through due to the friction caused between the outer jacket and the inner wall of the conduit.

BRIEF DESCRIPTION OF THE DRAWINGS

These and other features, aspects, and advantages of the present invention will become better understood with regard to the following description, appended claims, and accompanying drawings where:

FIG. 1 is a perspective view of a cable assembly, showing the cable member in disposed within the outer jacket member in slidable relation;

FIG. 2 is a side view of an outer jacket member being pulled off of a roll by a pull cord or tape, and also showing a cable member being carried thereby;

FIG. 3 is a perspective view of a cable assembly showing a plurality of cables being carried by a single outer jacket member; and FIG. 4 is a perspective view of a cable assembly being used in conjunction with an innerduct structure.

DETAILED DESCRIPTION

As shown in FIG. 1, a cable assembly 2 includes a cable member 4 and an outer jacket member 6 disposed about the cable member in slidable relation. In a preferred embodiment, the outer jacket member is a woven article, made from low friction, synthetic fibers such as polyester, nylon, Teflon (polytetraflouroethylene), polyaramid, PEEK (polyether ether ketone), or polyvinylidene fluoride. The outer jacket member serves as a sleeve that extends at least the same length as the cable member. The outer jacket member 6 may be woven around the cable member 4 in the manufacturing process, or the cable member 4 may be inserted into the outer jacket 6 after the manufacture thereof.

In use, as shown in FIG. 2, the outer jacket 6 carrying the cable member 4 may be attached at one end to a pull cord or tape 8 that extends through the length of a conduit (not shown). A pulling force is exerted on the pull cord 8 at a remote end, causing the outer jacket member 6 and cable member 4 to be drawn through the conduit. The outer jacket 6 bears most of the force of the pulling action, and the only force exerted directly on the cable member 4 is that of friction between the jacket and the cable. Because the outer jacket should be capable of withstanding such a pulling force, it should have sufficient tensile strength in the longitudinal direction to allow successful installation without mechanical failure of the jacket. The breaking strength of the outer jacket in the longitudinal direction is preferably greater than 600 pounds. High tenacity fibers and yarns are preferred materials to construct the outer jacket. In an alternate method, the cable assembly may be blown into the conduit, as described previously.

The outer jacket also serves another purpose, which is to reduce the friction of the cable insertion process. The outer sheath 10 on a typical fiber optic cable is generally an extruded layer of polyolefin, particularly medium density or high-density polyethylene (HDPE). This solid outer sheath 10 serves to protect the optic fibers 12 against environmental degradation and also protects the strength member from abrasion as the conventional strength member has very poor abrasion resistance and cannot be used on the outside of a cable assembly. The outer sheath on a coaxial cable is usually polyvinyl chloride (PVC), used for its flame retardant characteristics. Generally, conduit material is made of rigid PVC, highly filled.

EXAMPLE 1

Tests were performed to determine the coefficient of friction between the HDPE and the PVC with a silicone lubricant and without a lubricant. The results of this test are shown in Table 1. This test was performed in accordance with ASTM D4518 test method B—the Horizontal Pull Test for kinetic sliding friction measurement.

TABLE 1

| Material | COF With Lubricant (Silicone) | COF Without Lubricant |
|---|---|---|
| HDPE Cable Sheathing and PVC Conduit | 0.09–0.2 | >0.2 |

*COF = coefficient of friction

In contrast, friction tests were also performed to determine the coefficient of friction between various combinations of fabric and HDPE. The fabric used in these tests was made from a 520 denier monofilament polyester in the warp direction and nylon in the fill direction. In both tests, the cable used was AT&T Fite®cable. This test was also performed in accordance with ASTM D4518 test method B—the Horizontal Pull Test for friction measurement. The results are shown in Table 2.

TABLE 2

| Material | COF With Lubricant | COF Without Lubricant |
|---|---|---|
| Fabric and Fabric | 0.10 | 0.12 |
| Fabric and HDPE | 0.07 | 0.17 |
| Fabric and PVC conduit | 0.07 | 0.09 |

*COF = Coefficient of Friction

It can be seen from the above Tables that the non-lubricated fabric and HDPE exhibit a coefficient of friction in the same range as the lubricated HDPE and PVC. This fact represents a significant cost savings in the process, because the present method and apparatus obviates the need for lubricants as well as the associated tanks, pumps and other hardware required to deliver the lubricants.

The melting point of the outer jacket should be greater than 150° C., consistent with the melting points of the preferred materials used to manufacture the outer jacket. For example, the melting point of polyester fiber and Nylon 6,6 fiber is in the range of 250–265° C. This range is significantly higher than the melting point for HDPE (generally between 120–130° C.), which is the preferred outer sheathing for most fiber optic cables. Thus, the lower coefficient of friction exhibited by the outer jacket, combined with the higher melting point, allows the cable assembly to be pulled through the conduit at high speeds without the cable sustaining damage due to the sheath melting or burning through.

As shown in FIG. 3, a plurality of cable members 4 may be slidably carried within the outer jacket member 6. In a preferred embodiment, the outer jacket member 6 is woven around the cable 4 during the manufacturing process, but it is also contemplated that the cables 4 may be inserted into the outer jacket member 6 in a separate step after the manufacture thereof. Optionally, the outer jacket member may be fire resistant, particularly when the cable assembly is being used within a building or other structure. The outer jacket may be made fire resistant by choosing fire resistant materials, or a fire resistant coating may be applied. Alternatively, the outer jacket may be made from reinforced composite materials, such as glass fiber reinforced epoxy or polyester composites, resin impregnated woven textile composites, or organic/inorganic hybrid composites.

FIG. 4 shows a cable assembly 2, including the outer jacket member 6 and the cable member 4, in use within a textile innerduct structure 14 that is disposed within a rigid or semi-rigid conduit. The innerduct structure 14 shown is described and claimed in U.S. patent application Ser. No. 09/400,778, which is incorporated herein by reference in its entirety. This arrangement allows the outer jacket 6 carrying one or more cables 4 to pass within one channel of the innerduct 14 without directly subjecting the cable 4 to high levels of friction. The fabric-to-fabric coefficient of friction shown in Table 2 illustrates that lubricant is not necessary for speedy and efficient insertion of the cable assembly within the textile innerduct structure. It should be understood, however, that a lubricant may be used together with the outer jacket cable assembly, if desired.

Thus, it has been shown that a woven outer jacket disposed about a cable or a plurality of cables in slidable relation allows the cable to be inserted into a rigid or semi-rigid conduit with greater speed, less friction, and less likelihood of damage to the cable itself. Further, because the outer jacket bears the major portion of the force required to pull the assembly through the conduit, the cable (particularly fiber optic cable) need not be manufactured with extensive strength members incorporated therewith. The outer jacket also provides abrasion and cutting resistance.

While preferred embodiments have been disclosed and described in considerable detail, the spirit and scope of the appended claims should not be limited to the description of the preferred versions contained herein. For instance, although the cable assembly described herein has been more specifically directed to fiber optic cables, it is to be understood that any type of cable may be used within the cable assembly. Alternative features or components serving the same, equivalent or similar purpose may replace all features disclosed in this specification, unless expressly stated otherwise. Thus, unless expressly stated otherwise, each feature disclosed is one example only of a generic series of equivalent or similar features.

What is claimed is:

1. A cable assembly comprising:
   at least one cable member; and
   a woven outer jacket member disposed about said cable member so that said cable member is in slidable relation with said outer jacket member.

2. The cable assembly set forth in claim 1, wherein said outer jacket member is made from material selected from the group consisting of polyester, nylon, poytetraflouroethylene, PEEK and polyvinylidene fluoride, or any combination thereof.

3. The cable assembly set forth in claim 1, wherein said outer jacket member is made from a monofilament fiber.

4. The cable assembly set forth in claim 1, wherein said outer jacket exhibits a kinetic sliding coefficient of friction in the range of 0.07 and 0.09, when measured against solid PVC conduit material, in accordance with ASTM D4518 test method B.

5. The cable assembly set forth in claim 1, wherein said outer jacket exhibits a breaking strength in the longitudinal direction of greater than 600 pounds.

6. The cable assembly set forth in claim 1, wherein said outer jacket is made of fire resistant materials, such as polytetrafluoroethylene, polyvinylidene fluoride, or PEEK.

7. The cable assembly set forth in claim 1, wherein said outer jacket is made from material having a melting point greater than 150° C.

8. The cable assembly set forth in claim 1, wherein said outer jacket member is at least the same length as said cable member.

9. The cable assembly set forth in claim 1, wherein a plurality of cable members are disposed within a single outer jacket member.

10. The cable assembly set forth in claim 1, wherein said outer jacket member is a fiber or textile reinforced composite material.

11. A process for inserting a cable into a conduit, said process comprising the steps of:
    providing at least one cable member;
    providing an outer jacket member around said cable member, so that said cable member is disposed within said outer jacket member in slidable relation; and
    imparting a force on said outer jacket member for insertion into a conduit, wherein said outer jacket member bears said force and carries said cable member into and through said conduit therewith.

12. The process for inserting a cable into a conduit as set forth in claim 11, wherein said step of imparting a force on said outer jacket member includes pulling said outer jacket member through said conduit.

13. The process for inserting a cable into a conduit as set forth in claim 11, wherein said step of imparting a force on said outer jacket member includes blowing said outer jacket member through said conduit.

14. The process for inserting a cable into a conduit as set forth in claim 11, wherein said outer jacket member is made from material selected from the group consisting of polyester, nylons, polytetraflouroethylene, PEEK, and polyvinylidene fluoride, or any combination thereof.

15. The process for inserting a cable into a conduit as set forth in claim 11, wherein said outer jacket member is made from monofilament fiber.

16. The process for inserting a cable into a conduit as set forth in claim 11, wherein said outer jacket member is a woven article.

17. The process for inserting a cable into a conduit as set forth in claim 11, wherein said outer jacket member is at least the same length as said cable member.

18. The process for inserting a cable into a conduit as set forth in claim 11, wherein said outer jacket exhibits a coefficient of friction in the range of 0.07 and 0.09, when measured against solid PVC conduit material, in accordance with ASTM D4518 test method B.

19. The process for inserting a cable into a conduit as set forth in claim 11, wherein said outer jacket exhibits a breaking strength of greater than 600 pounds in the longitudinal direction.

20. The process for inserting a cable into a conduit as set forth in claim 11, wherein said outer jacket is made from fire resistant materials such as fluoropolymers, aramid, PEEK or polyimide.

21. The process for inserting a cable into a conduit as set forth in claim 11, wherein sad outer jacket is made from material having a melting point greater than 150° C.

22. The process for inserting a cable into a conduit as set forth in claim 11, further including the steps of:
    providing an innerduct structure within said conduit; and
    inserting said outer jacket and cable member through said innerduct structure within said conduit.

23. The process for inserting a cable into a conduit as set forth in claim 11, wherein said outer jacket member is a fiber or textile reinforced composite material.

* * * * *

UNITED STATES PATENT AND TRADEMARK OFFICE
CERTIFICATE OF CORRECTION

PATENT NO.   : 6,398,190 B1
DATED        : June 4, 2002
INVENTOR(S)  : Shulong Li It is certified that error appears in the above-identified patent and that said Letters Patent is hereby corrected as shown below:

Column 5,
Line 27, after "nylon," delete "poytetraflouroethylene" and insert
-- polytetraflouroethylene --.

Signed and Sealed this

Eleventh Day of March, 2003

JAMES E. ROGAN
*Director of the United States Patent and Trademark Office*